May 24, 1932.     A. STEINLE     1,859,722
FIRE CONTROL APPARATUS
Filed June 18, 1929     2 Sheets-Sheet 1

Inventor:
Adolf Steinle

Patented May 24, 1932

1,859,722

UNITED STATES PATENT OFFICE

ADOLF STEINLE, OF JENA, GERMANY, ASSIGNOR TO N. V. NEDERLANDSCHE INSTRU-MENTEN COMPAGNIE, OF THE HAGUE, NETHERLANDS

FIRE CONTROL APPARATUS

Application filed June 18, 1929, Serial No. 371,839, and in Germany June 22, 1928.

The invention relates to firing directors which are fitted with a plotting device comprising a plotting pencil and a plane writing surface and serve for tracing the horizontal projection of the course of an air craft.

For finding in as simple a way as possible the horizontal speed of the air craft according to value and direction, the invention provides the apparatus with the following: a system of straight lines which are parallel to each other and lie in one plane, means for turning this system and the said writing surface relatively to each other so as to give the lines relatively to the traced curve a position in which they seem to be parallel to the main direction of the traced curve, and an indicating device for indicating the said position, which corresponds to the sought direction of the horizontal speed. The apparatus has also a following device consisting of two mark systems of which the one is displaced by means of the writing device according to the movement of the plotting pencil relative to the writing surface and the other by means of a regulating mechanism of adjustable speed. Another indicating device is provided for indicating that speed which the said mechanism must be given so as to maintain the coincidence of the two mark systems and which corresponds to the sought value of the horizontal speed.

The said system of straight lines is conveniently provided in close proximity to the writing surface and suitably marked on a transparent disc. Instead of having the said system of straight lines itself arranged near the writing surface, it may be projected on the writing surface by means of a projection device.

The regulating mechanism of adjustable speed is conveniently one of the well-known friction gears that have a friction wheel which is adjustable relatively to a friction disc driven by a clock-work or by a motor of uniform speed. The mark systems of the following device may be single marks or groups of marks as, e. g., successive sectors of different colours, which allow of a specially exact coincidence.

Figure 1:
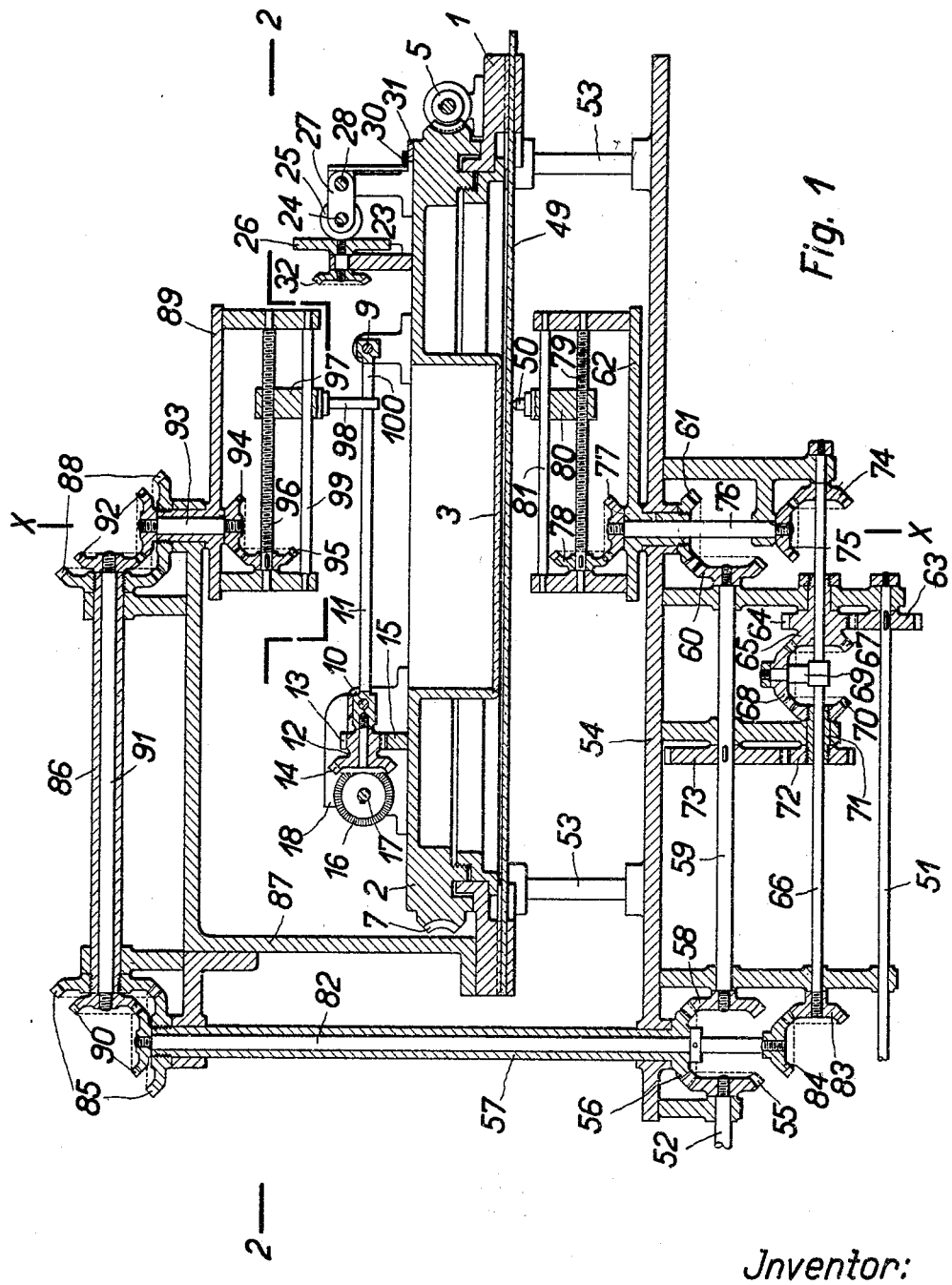
Figure 2:
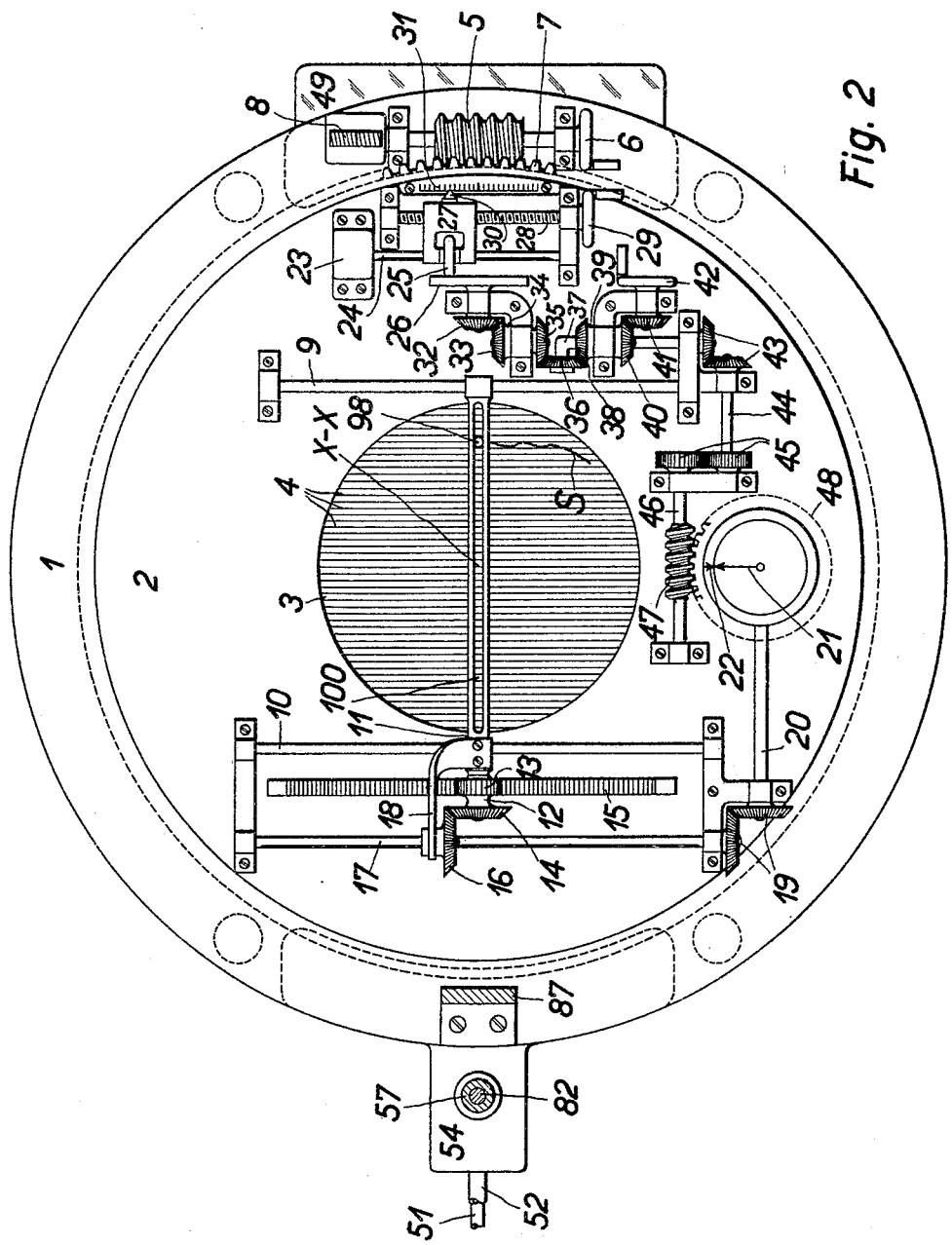

In the accompanying drawings, Figures 1 and 2 respectively represent a constructional example of the invention in a front elevation and in a cross section.

On a base plate 1, rotatable about an axis X—X, there is disposed a body 2 carrying a transparent disc 3 which is provided with a number of parallel lines 4. The body 2 is turned by means of a worm 5 which, mounted on the base plate 1, is rigidly connected to a hand wheel 6 and meshes with a worm gearing 7 of the body 2. The worm 5 is coupled with a measuring drum 8 which indicates the relative positions of the disc 3 and the base plate 1 on a graduation that is to be assumed to represent angles. Along two guide rods, 9 and 10, which are parallel to the said lines 4, a slide 11 is movably disposed on the body 2. On this slide a wheel body 12 containing a spur gearing 13 and a bevel gearing 14 is rotatably provided in such a way that its turning axis is perpendicular to the guide rod 10. The spur gearing 13 engages a rack 15 fast with the body 2, whereas the bevel gearing 14 meshes with a bevel wheel 16 which is disposed displaceably along a grooved shaft 17 parallel to the guide rod 10 and is made to participate in the displacements of the slide 11 by means of a stud 18 provided on the said slide. The grooved shaft 17 is rotatably disposed on the body 2. Its turning movements are transmitted by means of a pair of bevel wheels 19 and a shaft 20 to an indicator 21, which represents one of the two marks of a following device, in such a way that the said indicator 21 is imparted a turning movement that is proportional to the displacement of the slide 11. For adjusting by hand a second indicator, 22, which represents the other of the two marks of the following device, in such a way as to make it coincide with the indicator 21, and for maintaining by motor force the coincidence thus provided, the following arrangement is made. By means of a clockwork 23 a uniform speed is imparted to a grooved shaft 24 whereon there is displaceably arranged a friction wheel 25 which, together with a friction disc 26, forms a friction gearing and can be displaced by means of a slide 27, a threaded spindle 28 and a hand wheel 29. The distance of the friction wheel 25 from the centre of the friction disc 26 is indicated by an indicator 30 of the slide 27 on a graduation 31 of the body 2, which is to be supposed to represent speeds. The friction wheel 26 is rigidly connected with a bevel wheel 32 which meshes with a bevel gearing 33 of a wheel body 34. A second bevel gearing 35 of this wheel body forms the crown wheel of a differential gear whose planet wheel 36 is rotatably provided on the bent end of a shaft 37. The second crown wheel of this differential gear is formed by a bevel gearing 38 of a wheel body 39 which is loosely rotatable on a shaft 37 and contains a second bevel gearing 40 meshing with a bevel wheel 41 rotatable by means of a hand wheel 42 which serves for manually adjusting the indicator 22 in the manner described above. The turning movements of the shaft 37 are imparted to the indicator 22 by means of a pair of bevel wheels 43, a shaft 44, a pair of spur wheels 45, a shaft 46, a worm 47, and a worm gearing 48.

In close proximity to the transparent disc 3, on the base plate 1, there is exchangeably disposed a transparent writing plate 49 whereon the horizontal projection of the course of an air craft is traced by means of a plotting pencil 50. With two shafts, 51 and 52, which, respectively, are to be assumed as driven in accordance with the alteration of the horizontal projection of the distance of the air craft from the firing director, and with the alteration of the azimuth of the aiming line to the air craft, the plotting pencil 50 is connected in the following manner. The shaft 52, which is rotatably disposed on a plate 54 rigidly connected with the base plate 1 by means of bolts 53, is provided with a bevel wheel 55 meshing with a bevel wheel 56 which is rigidly connected with a hollow shaft 57 rotatably disposed on the plate 54. With the bevel wheel 56 there is meshing a bevel wheel 58 which is disposed on a shaft 59 rotatably provided on the plate 54. A second bevel wheel 60 of the shaft 59 meshes with a bevel wheel 61 which is screwed to an arm 62 provided on the plate 54 and rotatable about the axis X—X. Consequently, when the shaft 52 is turned, the said arm 62 is imparted a turning movement about its turning axis X—X, which is proportional to the turning movement of the shaft 52. The shaft 51 carries a toothed wheel 63 meshing with the teeth 64 of a wheel body 65 which is loosely rotatable on a shaft 66. The wheel body 65 is also provided with a bevel gear 67 forming one crown wheel of a differential gear whose planet wheel 68 is rotatably disposed on a trunnion 69 belonging to the shaft 66 and being perpendicular to the turning axis of the shaft 66. The second crown wheel of the differential gear is formed by a bevel wheel 70 screwed on a bush 71 which is loosely rotatable about the shaft 66. The bush 71 is rigidly connected also with a toothed wheel 72 which meshes with a toothed wheel 73 of the shaft 59. A bevel wheel 74 fast with the shaft 66 meshes with a bevel wheel 75 disposed on a shaft 76 which is provided in a bore of the arm 62 and is rotatable about an axis coinciding with the turning axis X—X of the arm. The shaft 76 is provided with a bevel wheel 77 which meshes with a bevel wheel 78. This bevel wheel is attached to a threaded spindle 79 which is rotatably disposed on the arm 62. The threaded spindle 79 engages a female fitting 80 which holds the plotting pencil 50 and, in order to be prevented from turning, is kept in position by a guide spindle 81 attached to the arm 62. By means of the device above set forth it is attained that the plotting pencil 50 is moved along the spindles 79 and 81 solely by a turning of the shaft 51, so that, consequently the distance from the axis X—X is not influenced by a turning of the shaft 52.

Whereas, as explained above, the turning of the shaft 52 entails a turning of the hollow shaft 57, which, as will be readily understood, corresponds to a turning of the arm 62, the shaft 66, in order to have the shaft 82, which is rotatably disposed in the hollow shaft 57, coupled with the shaft 76 in such a way that its turning movement corresponds to that of the latter, is provided with a bevel wheel 83 meshing with a bevel wheel 84 on the shaft 82. The turning movements of the hollow shaft 57 are transmitted by means of a pair of bevel wheels 85 to a hollow shaft 86 rotatably disposed on a support 87 fixed to the base plate 1. The turning movements of the said hollow shaft 86, in their turn, are imparted by a pair of bevel wheels 88 to an arm 89 which is rotatably provided on an axis coinciding with the axis X—X. The turning movements of the shaft 82 are transmitted by means of a pair of bevel wheels 90 to a shaft 91 which is rotatably disposed in the hollow shaft 86. The turning movements of the shaft 91 are imparted by means of a pair of bevel wheels 92 to a shaft 93 disposed in a bore of the arm 89 and rotatable about an axis coinciding with the turning axis of the arm and, consequently, also with the turning axis X—X. The shaft 93 carries a bevel wheel 94 meshing with a bevel wheel 95. This bevel wheel is attached to a threaded spindle 96 which is rotatably provided on the arm 89. The threaded spindle 96 meshes with a female fitting 97 which is the support of a trunnion 98 and, in order to be prevented from turning, is held in position by means of a guide spindle 99 attached to the arm 89. The arrangement must be assumed as provided in such a way that the axis of the trunnion 98 always coincides with the axis of the plotting pencil 50. The trunnion 98 extends into a slot 100 of the slide 11, which is perpendicular to the moving direction of the said slide 11.

When using the apparatus it is supposed that from other parts of the firing director the shaft 51 is actuated in correspondence with the alteration of the horizontal range, and the shaft 52 in correspondence with the alteration of the azimuth of the aiming line to the air craft, so that the curve S traced on the writing plate 49 by the plotting pencil 50 represents the horizontal projection of the course of the air craft. When applying the apparatus, care has still to be taken that, by means of the hand wheel 6, the disc 3 is permanently adjusted in such a manner that its parallel lines 4 are parallel to the straight line which corresponds best to that part of the curve S, which was plotted last, and that—with the clock work 23 going—the distance of the friction wheel 25 from the centre of the friction disc 26 is adjusted in such a manner that the indicator 22 maintains its coincidence with the indicator 21 coupled to the plotting pencil 50. Then, on the measuring drum 8, the direction and, by means of the indicator 30, on the graduation 31, the value of the horizontal component of the speed of the air craft are indicated. If so required, without difficulty, there can be provided an arrangement for continuous transmission of the values corresponding to the said two indications to other parts of the firing director.

I claim:

1. Apparatus for firing directors, for ascertaining the value and the direction of the horizontal component of the speed of an air craft, comprising a base plate, a plotting device of two members, a writing surface and a plotting pencil, of these two members the one being rigidly connected to the base plate and the other being movably disposed on the said base plate, means for moving this other member, a device consisting of a system of straight lines parallel to each other and being rotatably disposed on the base plate, an indicating device for indicating the position of this system relative to the base plate, a following device having two marks, means for coupling the one of these two marks to the said other member of the plotting device, a driving gear, means for coupling this driving gear to the other of these two marks, a regulating mechanism provided between this driving gear and the said other mark and being adapted to regulate the speed which the driving gear imparts to the said other mark, and a second indicating device for indicating the speed which the said other mark has in each instance.

2. Apparatus for firing directors, for ascertaining the value and the direction of the horizontal component of the speed of an air craft, comprising a base plate, a plotting device of two members, a writing surface and a plotting pencil, of these two members the one being rigidly connected to the base plate and the other being movably disposed on the said base plate, means for moving this other member, a transparent disc having a system of straight lines parallel to each other and being disposed in close proximity to the writing surface, a carrier carrying this disc and being rotatably disposed on the base plate, an indicating device for indicating the position of this carrier relative to the base plate, a following device having two marks, means for coupling the one of these two marks to the said other member of the plotting device, a driving gear, means for coupling this driving gear to the other of these two marks, a regulating mechanism provided between this driving gear and the said other mark and being adapted to regulate the speed which the driving gear imparts to the said other mark, and a second indicating device for indicating the speed which the said other mark has in each instance.

3. Apparatus for firing directors, for ascertaining the value and the direction of the horizontal component of the speed of an air craft, comprising a base plate, a plotting device of two members, a writing surface and a plotting pencil, the writing surface being rigidly connected to the base plate, for carrying the plotting pencil an arm rotatably disposed on the base plate, means for turning this arm, means for displacing the plotting pencil along the arm, a transparent disc having a system of straight lines parallel to each other and being disposed in close proximity to the writing surface, a carrier carrying this disc and being rotatably disposed on the base plate, an indicating device for indicating the position of this carrier relative to the base plate, a slide disposed on this carrier and displaceable in the direction of the said straight lines, means adapted to transmit to this slide the movements of the plotting pencil in the direction of the said straight lines, a following device having two marks and being disposed on the said carrier, means for coupling one of these two marks to the said slide, a driving gear, means for coupling this driving gear to the other of these two marks, a regulating mechanism provided between this driving gear and the said other mark and being adapted to regulate the speed which the driving gear imparts to the said other mark, and a second indicating device for indicating the speed which the said other mark has in each instance.

4. Apparatus for firing directors, for ascertaining the value and the direction of the horizontal component of the speed of an air craft, comprising a base plate, a plotting device of two members, a writing surface and a plotting pencil, of these two members the one being rigidly connected to the base plate and the other being movably disposed on the said base plate, means for moving this other member, a device consisting of a system of straight lines parallel to each other and being rotatably disposed on the base plate, an indicating device for indicating the position of this system relative to the base plate, a following device having two marks, means for coupling the one of these two marks to the said other member of the plotting device, a driving gear disposed on the said carrier, a friction gear provided between this driving gear and the other of the said two marks and being disposed on the said carrier, this friction gear comprising two parts, a friction wheel and a friction disc, means for coupling of these two parts the one to the said driving gear and the other to the said other mark, means for displacing these two parts relatively to each other, and a second indicating device for indicating the position which these two parts have relative to each other.

ADOLF STEINLE.